United States Patent [19]

Wu

[11] Patent Number: 4,825,671
[45] Date of Patent: May 2, 1989

[54] COMBINED LOCK FOR A STEERING WHEEL AND A HAND BRAKE

[76] Inventor: Wen Y. Wu, 12F-3, No192, Chung Cheng 2nd Road, Kaohsiung, Taiwan

[21] Appl. No.: 178,545

[22] Filed: Apr. 7, 1988

[51] Int. Cl.⁴ ............................................. E05B 65/12
[52] U.S. Cl. ........................................ 70/238; 70/202; 70/211
[58] Field of Search ................. 70/230, 239, 209, 210, 70/211, 201, 202, 198, 199, 200, 203, 212, 237, 247; 180/287

[56] References Cited

U.S. PATENT DOCUMENTS 4,747,279  5/1988  Solow ................................... 70/238

FOREIGN PATENT DOCUMENTS 928570  6/1947  France ................................... 70/238
1223123  2/1971  United Kingdom ................... 70/238
2024307  1/1980  United Kingdom ................... 70/238

Primary Examiner—Robert L. Wolfe
Attorney, Agent, or Firm—Kirschstein, Kirschstein, Ottinger & Israel

[57] ABSTRACT

A combined lock for a steering wheel and a hand brake, wherein a steering wheel lock is used to lock the steering wheel immovable and an extensible bar lock is used to lock the hand brake immovable. Said steering wheel lock is combined with the extensible bar lock by means of a steering wheel lock tube and an extensible bar movably contained in said tube and in said extensible bar lock, said bar pivotally connected with a hand brake cylinder; therefore, after the steering wheel locked, adjusting the extensible bar, shielding said cylinder around the hand brake and locking the extensible bar lock can lock both the steering wheel and the hand brake immovable at the same time.

1 Claim, 3 Drawing Sheets

COMBINED LOCK FOR A STEERING WHEEL AND A HAND BRAKE

BACKGROUND OF THE INVENTION

At present a steering wheel lock on market commonly called "a stick lock" consists of two extensible bars combined together adjustable in its length, making use of two hooked ends hooking with the steering wheel and with the brake pedal so that the car can be safeguarded from being stolen.

Nevertheless, such a lock is not so convenient for practical use, because the brake pedal is located at the front bottom of the driver's seat and the space of the driving scetion is so narrow that placing the lock to hook the brake pedal is quite troublesome as to bend the body and to extend both hands to said pedal. Besides, in order to lock the lock the car door beside the driver's seat has to be opened.

SUMMARY OF THE INVENTION

In view of the disadvantage of the steering wheel lock above-mentioned, this new combined lock for a steering wheel and a hand brake has been worked out to furnish a car lock more convenient and handy to use and more effective for preventing a car from being stolen.

This combined lock comprises a steering wheel lock consisting of a curved upper lock body connected with a lock head and a curved lower body connected with a lower lock body base, both said upper and lower lock bodies pivotally connected with for locking the round body of the steering wheel. A steering wheel lock tube is fixed with the lower lock body base at one end and fixed with an extensible bar lock base at the other end, and an extensible bar movably contained in said tube movably penetrates through said extensible bar lock base and pivotally connected with a connector set on a hand brake cylinder. At first, locking the steering wheel lock on the steering wheel, adjusting the length of the extensible bar, shielding the brake cylinder around the hand brake and locking the extensible bar lick can effect this combined lock to keep the steering wheel and the hand brake immovable, preventing the car from being stolen.

DETAILED DESCRIPTION OF THE INVENTION

Figure 1:
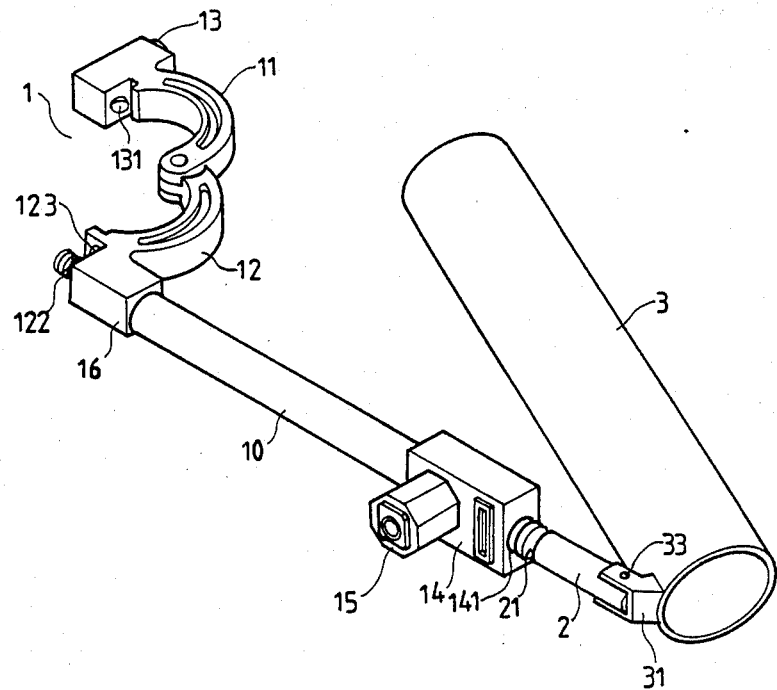
FIG. 1 is a general view of this combined lock for a steering wheel and a hand brake in accordance with the present invention.
Figure 2:
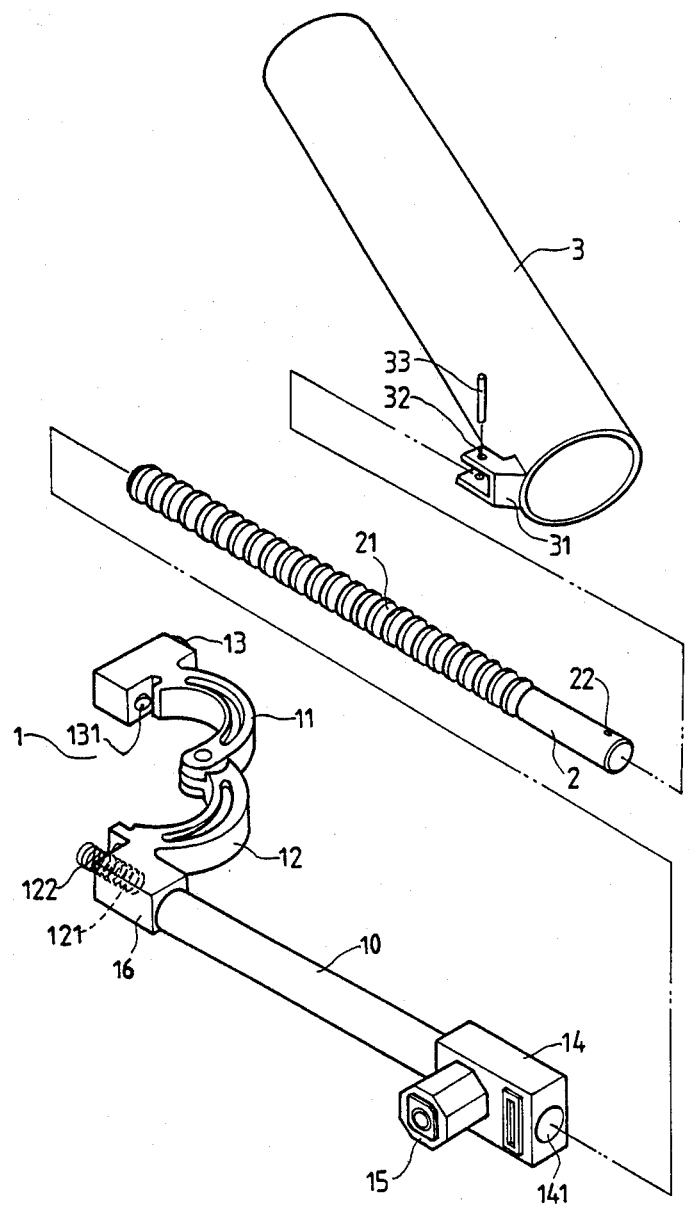
FIG. 2 is a view of the extensible bar separated from the connector in accordance with the present invention.

This combined lock for a steering wheel and a hand brake comprises a steering wheel lock 1, and extensible bar 2, a hand brake cylinder 3, a steering wheel lock tube 10, and an extensible bar lock 15 as its main parts, as shown in FIGS. 1 and 2.

The steering wheel lock tube 10 is centrally hollow for the extensible bar 2 to combine inside and able to extend in and out thereof; said lock tube 10 is fixed with a lower lock body base 16 at the upper end and with a lock base 14 at the lower end.

The steering wheel lock 1 comprises a curved upper lock body 11, a curved lower body 12 and a lock head 13 which is made to connect with said upper lock body 11 as one unit, and the lower lock body base 16 is made to connect with said lower lock body 12 as one unit, so said lower lock body 12, said lower lock body base 16 and said lock tube 10 is made as one unit. Said upper lock body 11 and lower lock body 12 are pivotally connected with a pin at the adjoining ends thereof. Said upper lock body 11 and said lower lock body 12 can be put around the round body of steering wheel 4, and a dead bolt 131 provided in the lock head 13 and able to be extended out or in said head 13 by means of key can extend into a recess 123 set in said lower lock body 12 for locking steadfast when both lock bodies 11, 12 are put together. Besides, there is a coil spring 122 set in a hole 121 in the vertical side of the lower lock body base 16 for resilinetly pushing up open said upper lock body 11 when this lock is unlocked.

The extensible bar 2 is provided with a plurality of ring grooves 21 around it which are set at an equal distance for the dead bolt 151 of the extensible bar lock 15 to lock in, and with a pin hole 22 at its lower end for a pin to pivotally connect with the hand brake cylinder 3.

The hand brake cylinder 3 is an empty cylinder, one of its ends closed and the other open, and longer than the hand brake 5 so that said cylinder 3 can completely shield around said brake 5 to hamper it from illegally being pressed at the control key 51 thereof. Besides, said cylinder 3 is provided with a connector 31 at the side of its open end for pivotally connecting the end of said extensible bar 2 by means of a pin 33 penetrating a pin hole 22 in said bar 2 and two pin holes 32 in the connector 31.

Figure 3:
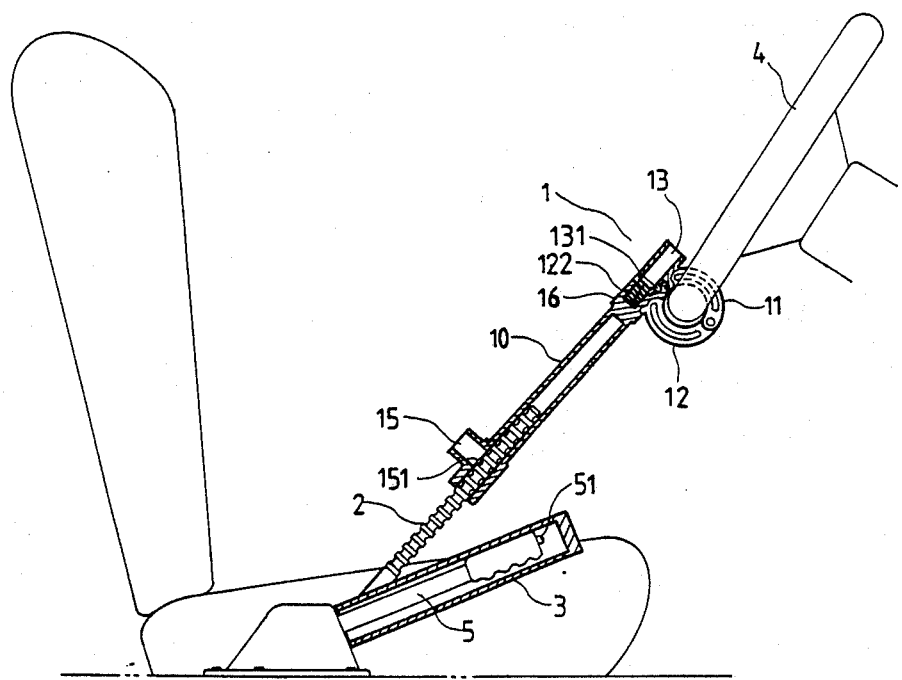
FIG. 3 is a cross-sectional view of this combined lock for a steering wheel and a hand brake in practical use in accordance with the present invention.

Now, how to operate this combined lock is to be described. The hand brake cylinder 3 can be moved up and down with the pin 33 as a pivot and the extensible bar 2 can be turned around for 360° inside the extensible bar lock 14 so that said cylinder 3 can actually be adjusted to any angle. Therefore, in using this combined lock, first, said cylinder 3 is to be placed shielding completely around the hand brake 5, next, the steering wheel lock tube 10 is to be pulled up to the steering wheel, the upper and the lower lock bodies are to be adapted to surround the round body of the steering wheel and to be locked with a key; next, the extensible bar lock 15 is to be locked with the key; now this combined lock has been locked, confining the steering wheel 4 and the hand brake 5 at the locked position impossible to be illegally manipulated by a thief as shown in FIG. 3. And the operation can all be performed at the right side of the driver, between the steering wheel and the hand brake so that the scope of sight is not hindered, and handling this lock is more simple than other locks.

What is claimed is:

1. A combined lock for a steering wheel and a hand brake comprising:
   a steering wheel lock provided with a curved upper lock body connected with a lock head, and curved lower lock body connected with a lower lock body base fixed with a steering wheel lock tube;
   a steering wheel lock tube having a longitudinal empty space for containing an extensible bar which can be extended out or in said tube, the upper end of said tube fixed with the lower lock body base and the lower lock body as one unit, the lower end of said tube fixed with an extensible bar lock base used for locking the extensible bar;

an extensible bar provided with a plurality of ring grooves around for the dead bolt of the extensible bar lock to lock therein, and movably contained inside the steering wheel lock tube and penetrating through the extensible bar lock base, the lower end of said extensible bar pivotally joined with a connector set beside the open end of a hand brake cylinder;

a hand brake cylinder having one of the ends closed and the other open and provided with a connector at the side of the open end for pivotally connecting the end of the extensible bar, and being longer than the hand brake so as to shield said hand brake therein; and operations that said steering wheel lock is to be locked around the round body of the steering wheel, said hand brake cylinder is to be shielded around the hand brake and then locking the extensible bar lock after adjusting the length of the extensible bar can lock both the steering wheel and the hand brake immovable.

* * * * *